(12) United States Patent
Fleming et al.

(10) Patent No.: US 8,560,143 B2
(45) Date of Patent: Oct. 15, 2013

(54) METHOD AND SYSTEM FOR ADJUSTING A PEDAL MAP

(75) Inventors: Matthew Eugene Fleming, Santa Ana, CA (US); Avernethy Francisco, Torrance, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 329 days.

(21) Appl. No.: 12/873,155

(22) Filed: Aug. 31, 2010

(65) Prior Publication Data

US 2012/0053796 A1    Mar. 1, 2012

(51) Int. Cl.
G06F 7/00    (2006.01)

(52) U.S. Cl.
USPC ................................. 701/1; 701/36

(58) Field of Classification Search
USPC .................................. 701/1, 36, 49
See application file for complete search history.

(56) References Cited

U.S. PATENT DOCUMENTS

| | | |
|---|---|---|
| 3,721,309 A | 3/1973 | Donaldson |
| 5,167,212 A | 12/1992 | Peter et al. |
| 5,627,752 A | 5/1997 | Buck et al. |
| 5,880,568 A | 3/1999 | Bederna et al. |
| 6,220,987 B1 | 4/2001 | Robichaux et al. |
| 6,246,951 B1 | 6/2001 | Robichaux et al. |
| 6,316,897 B1 | 11/2001 | Ewing |
| 6,480,779 B2 | 11/2002 | Mardberg |
| 6,584,395 B2 | 6/2003 | Satou et al. |
| 6,704,643 B1 * | 3/2004 | Suhre et al. ................... 701/115 |
| 6,879,902 B2 | 4/2005 | Nada |
| 7,006,917 B2 | 2/2006 | Hijikata |
| 2008/0114521 A1 | 5/2008 | Doering |
| 2008/0228369 A1 | 9/2008 | Stroh et al. |
| 2009/0069971 A1 | 3/2009 | Asahara et al. |
| 2009/0112439 A1 | 4/2009 | Kuang et al. |
| 2009/0216415 A1 | 8/2009 | Iwatsuki et al. |
| 2009/0240391 A1 * | 9/2009 | Duddle et al. .................. 701/33 |

FOREIGN PATENT DOCUMENTS

JP    63219839    9/1988

* cited by examiner

*Primary Examiner* — Michael McCullough
(74) *Attorney, Agent, or Firm* — Snell & Wilmer LLP (57) ABSTRACT

A method and system for adjusting a pedal map, the system includes an automobile which has a pedal map adjustment unit. The pedal map adjustment unit includes a processor, an accelerator pedal, a memory, an input unit, a speed detection unit, and/or a power train. The memory can store a pedal map, which indicates a desired output of the powertrain at particular speed value. The accelerator pedal can collect pedal data, the input unit can collect input data, and the speed detection unit can collect speed data. The processor, using the pedal data and the speed data can adjust pedal curves in the pedal map to intersect with a road load pedal angle curve. The road load pedal angle curve can indicate a pedal depression amount required to maintain the automobile at a particular speed value.

20 Claims, 7 Drawing Sheets

FIG. 7

METHOD AND SYSTEM FOR ADJUSTING A PEDAL MAP

BACKGROUND

1. Field

The present invention relates to a method and system for adjusting a pedal map.

2. Description of the Related Art

A conventional automobile includes a pedal and a powertrain. By depressing or releasing the pedal, a user indicates his desire to increase or decrease output of the powertrain. However, users of an automobile tend to have different height, shapes, and comfort levels. Thus, the user may not be comfortable depressing the pedal by a certain amount to correspond to a certain output of the powertrain. Some solutions have incorporated mechanical devices which allow for the physical movement of the pedal closer or further away from the user. However, such mechanical devices suffer from drawbacks such that the user may need to make several adjustments to determine his comfort level for the pedal position. In addition, such adjustments cannot be made while the automobile is moving. Since adjusting the pedal without the automobile moving can lead to inaccurate results, the user may have to start and stop the automobile multiple times. Such starting and stopping can also lead to more adjustments since the user may not have a quick comparison for various positions of the pedal.

Thus, there is a need for a method and system for adjusting a pedal map.

SUMMARY

The present invention relates to a method and system for adjusting a pedal map. The present invention can include an automobile. The automobile can include a pedal map adjustment system. The pedal map adjustment system can include a processor, a pedal system, a memory, a user input unit, a speed detection unit, and/or a power train. The memory can store a pedal map, which indicates a desired output of the powertrain at particular speed value. The pedal map can include a plurality of pedal curves and a road load pedal angle curve. A pedal curve indicates a desired output of the powertrain at a particular speed value for the depression amount corresponding to the pedal curve. The road load pedal angle curve indicates a pedal depression amount required to maintain the automobile at a particular speed value. The pedal system can collect pedal data, the user input unit can collect user input data, and the speed detection unit can collect speed data. The output of the powertrain can move the automobile.

The user can indicate through the user input unit that the user wishes to adjust the pedal map. The user can then depress a pedal in the pedal system to indicate a desired adjustment of the pedal depression amount required to maintain the automobile at the current speed value. The user can indicate through the user input unit that the user has completed adjusting the pedal. The processor, using the pedal data and the speed data can adjust pedal curves in the pedal map to intersect with a road load pedal angle curve.

By adjusting the pedal map, the user can adjust the pedal depression amount required to maintain the automobile at a particular speed while the user is driving. In addition this can reduce an amount of time required to adjust the pedal depression amount and increase an amount of comfort for the user.

In one embodiment, the present invention is a pedal map adjustment system including a pedal system generating pedal data, a memory storing a pedal map, a user input unit generating user input data indicating when the pedal map should be adjusted, and a processor connected to the pedal system, the memory, and the user input unit, the processor is configured to analyze the pedal data and adjust the pedal map based on the pedal data and the user input data.

In another embodiment, the present invention is an automobile including a powertrain generating an output and a pedal map adjustment system connected to the powertrain. The pedal map adjustment system can include a pedal system generating pedal data, the pedal data corresponding to a pedal depression amount of the pedal system, a memory storing a pedal map, a user input unit generating user input data indicating when the pedal map should be adjusted, and a processor connected to the pedal system, the memory, the user input unit, and the powertrain, the processor is configured to control a requested output of the powertrain based on the pedal map, and to analyze the pedal data and adjust the pedal map based on the pedal data and the user input data.

In yet another embodiment, the present invention is a method of adjusting a pedal map including storing, using a memory, a pedal map, generating, using a pedal system, pedal data corresponding to a pedal depression amount of the pedal system, generating, using a user input unit, user input data indicating when the pedal map should be adjusted, analyzing, using a processor, the pedal data and the user input data, and adjusting, using the processor, the pedal map based on the pedal data and the user input data.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
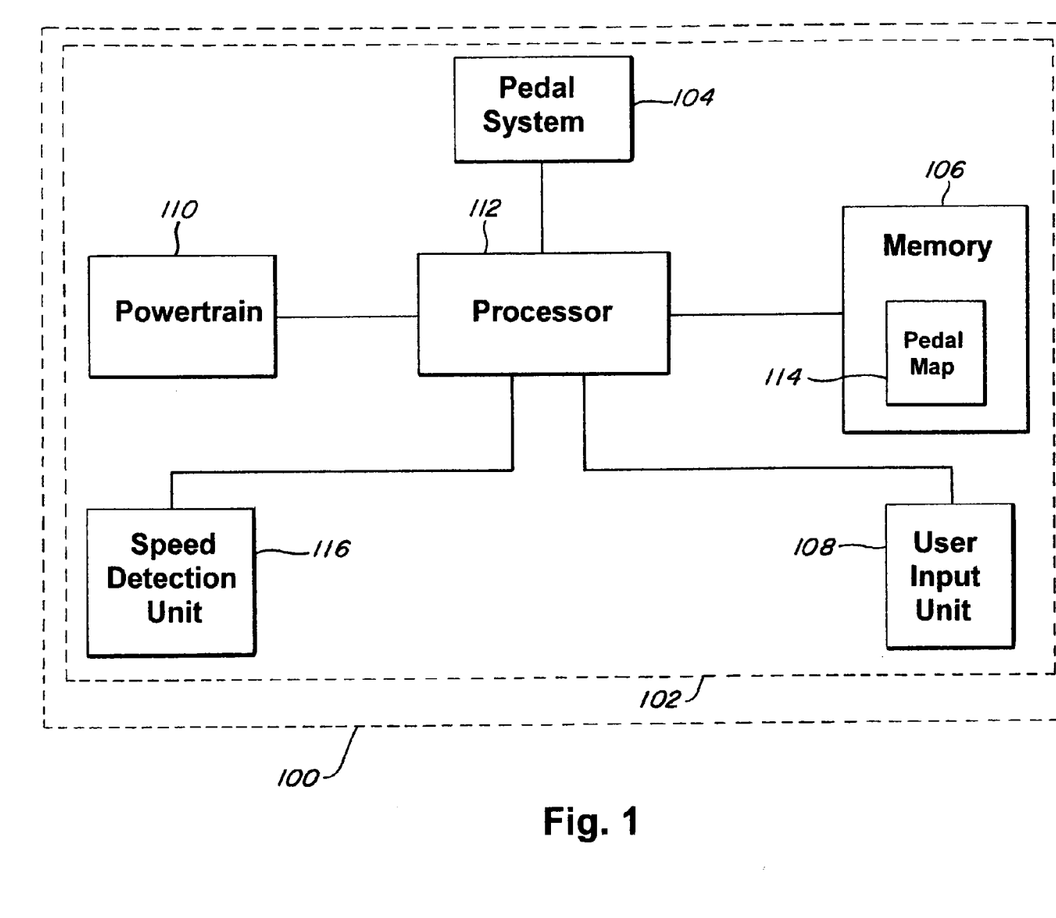
FIG. 1 is a box diagram of an automobile including a pedal map adjustment system according to an embodiment of the present invention.

In one embodiment, the present invention includes, for example, an automobile 100. The automobile 100 can include, for example, a pedal map adjustment system 102. The pedal map adjustment system 102 can include, for example, a pedal system 104, a memory 106, a user input unit 108, a powertrain 110, a processor 112, and/or a speed detection unit 116.

Figure 2:
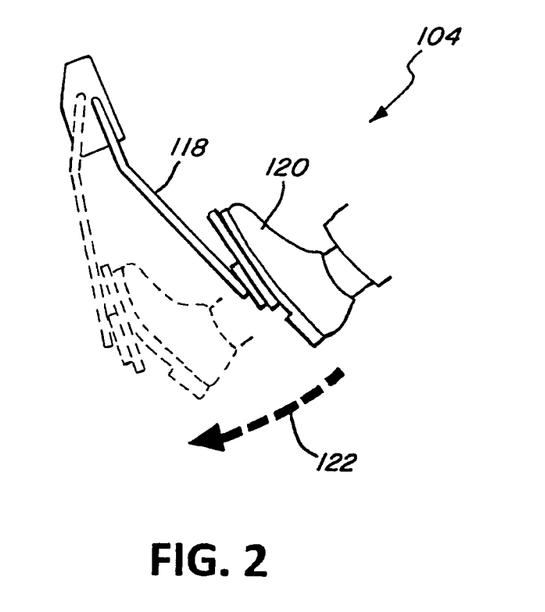
FIG. 2 depicts a pedal system according to an embodiment of the present invention.

The pedal system 104 can be connected, for example, to the processor 112. The pedal system 104 can include, for example, a pedal 118 as seen in FIG. 2. The pedal 118 can be depressed by a foot 120 of a user as indicated by an arrow 122. The pedal system 104 can also include, for example, a sensor which can generate pedal data. The pedal data can indicate a pedal depression amount. The pedal depression amount can be, for example, an angle. The pedal system 104 can transmit the pedal data, for example, to the processor 112.

Referring back to FIG. 1, the memory 106 is connected, for example, to the processor 112. The memory 106 can store, for example, a pedal map 114. The pedal map 114 can indicate, for example, a desired output of a powertrain based on the pedal depression amount and/or detected speed values of the automobile 100. The pedal map 114 can be seen, for example, in FIG. 3. The pedal map 114 can include, for example, a plurality of pedal curves 124 and a road load pedal angle curve 130. Each of the pedal curves 124 correspond to a different pedal depression amount. Each of the pedal curves 124 indicate an amount of torque output by the powertrain 110 for a given speed value of the automobile 100.

Figure 3:
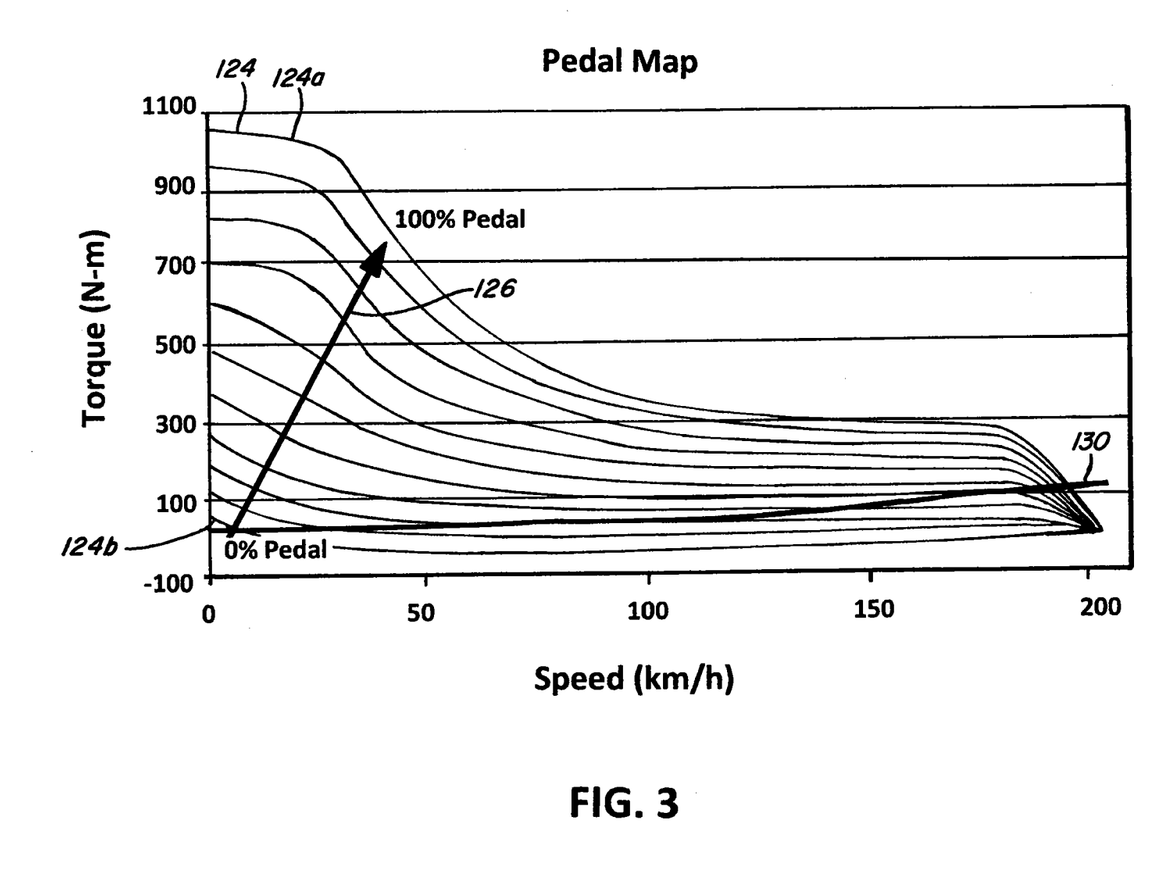
FIG. 3 depicts a pedal map according to an embodiment of the present invention.

The arrow 126 indicates, for example, a general increase in the pedal depression amount and the corresponding pedal curves. Thus, near the base of the arrow 126, the pedal curves 124 tend to correspond to a low pedal depression amount 118. However, near the tip of the arrow 126, the pedal curves 124 tend to correspond to a high pedal depression amount 118. For example, the pedal curve 124a corresponds to a 100% depression of the pedal 118, while the pedal curve 124b corresponds to approximately a 0% depression of the pedal 118. The road load pedal angle curve 130 indicates, for example, an amount of pedal depression that is required for the automobile 100 to maintain its speed value.

Figure 4:
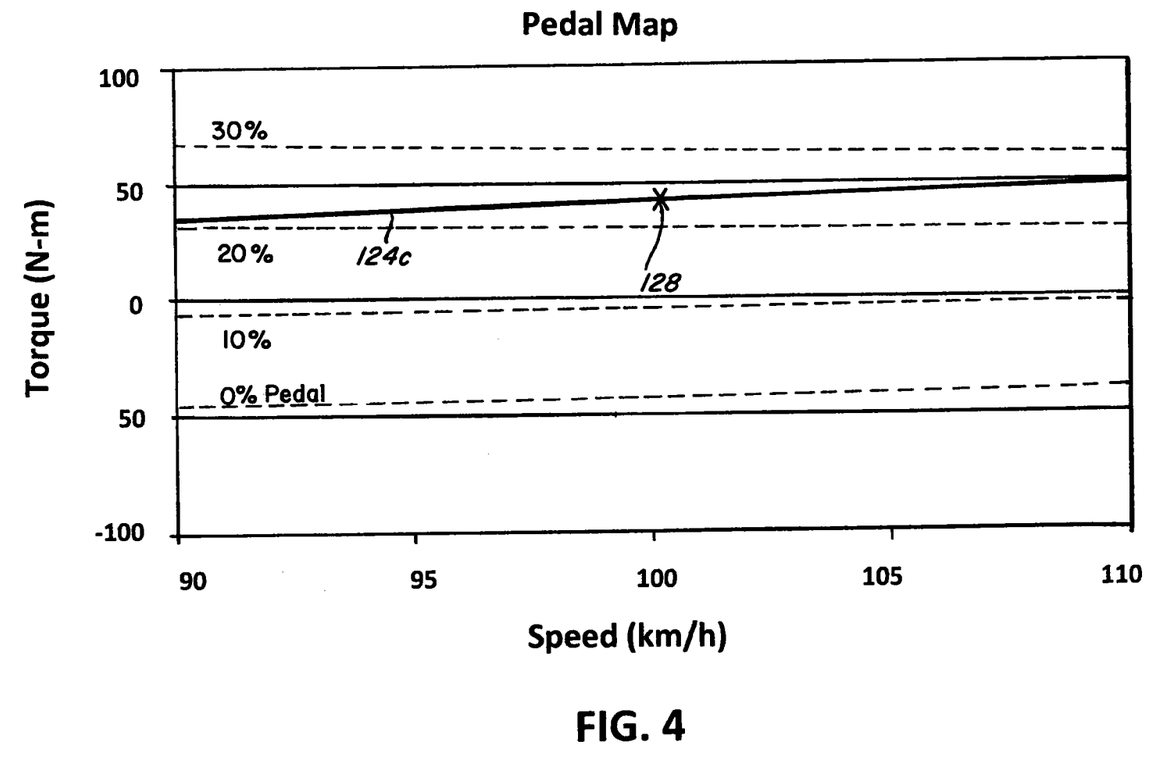
FIG. 4 depicts a pedal curve in a pedal map according to an embodiment of the present invention.
Figure 5:
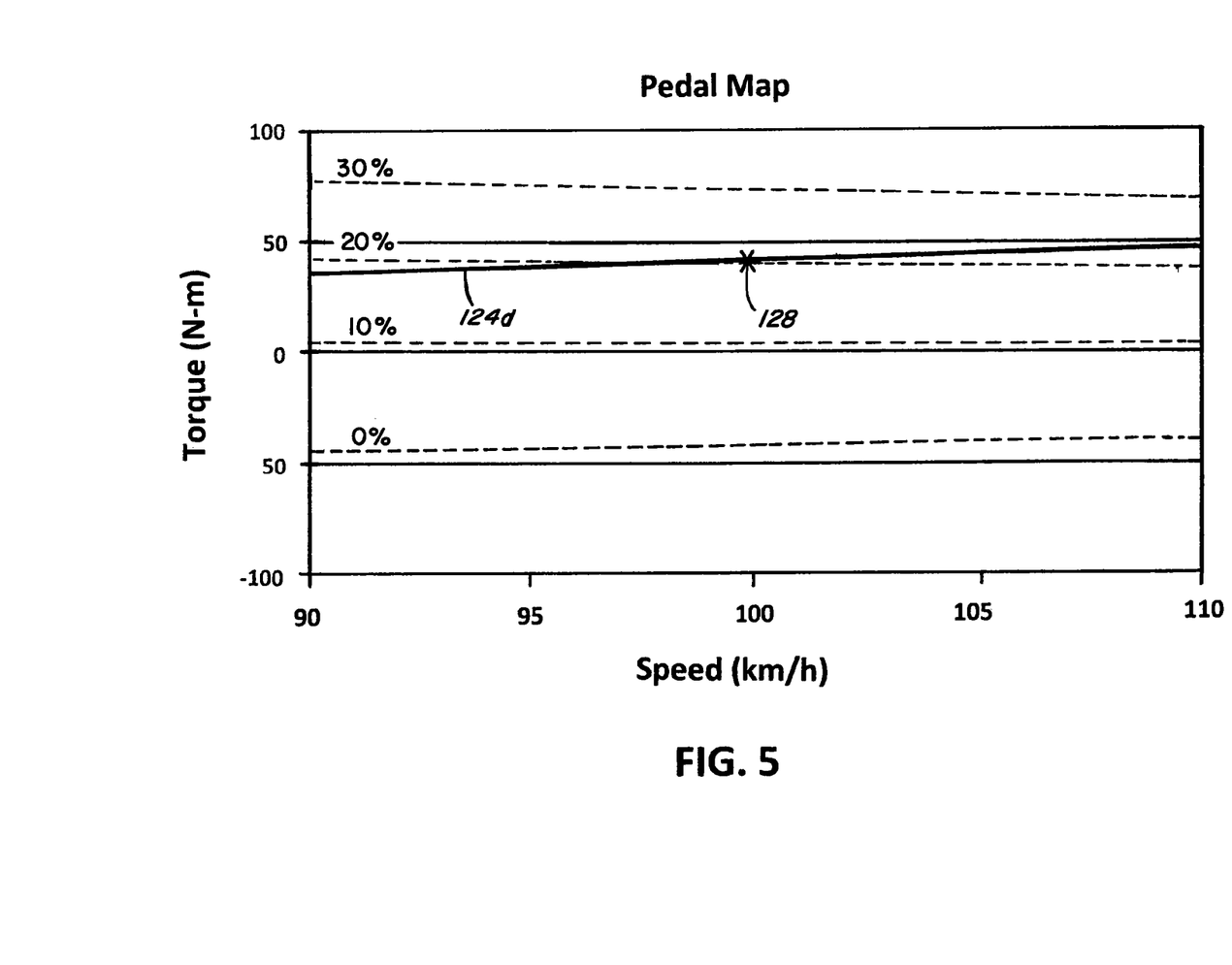
FIG. 5 depicts a pedal curve in a pedal map according to an embodiment of the present invention.

The pedal map 114 can be adjusted by the processor 112, as seen in FIG. 4 and FIG. 5. In FIG. 4, the pedal curve 124c at an approximately 23% depression of the pedal 118 would indicate that the desired output of the powertrain 110 is approximately 40 N-m at 100 km/h as shown by the mark 128. However, as seen in FIG. 5, the pedal curve 124c can be adjusted and decreased to be the pedal curve 124d. The pedal curve 124d indicates that at an approximately 18% depression of the pedal 118, the desired output of the powertrain 110 is approximately 40 N-m at 100 km/h as shown by the mark 128. Thus, for the same output of the powertrain at the same speed value of the automobile 100, there is a reduction in the amount that the pedal 118 is depressed. Put another way, instead of having to depress the pedal 118 by 23% to indicate a desired output of 40 N-m at 100 km/h, as shown in FIG. 4, the user only has to depress the pedal 118 by 18% to indicate the same desired output of 40 N-m at 100 km/h, as shown in FIG. 5.

Referring back to FIG. 1, the user input unit 108 is connected, for example, to the processor 112. The user input unit 108 can generate, for example, user input data. The user input data can indicate when the pedal map 114 should be adjusted. In one embodiment, the user input unit 108 can be, for example, a button, a dial, a switch, or any other type of device which can provide an indication that a user desires to adjust the pedal map 114.

The speed detection unit 116 is connected, for example, to the processor 112. The speed detection unit 116 can be, for example, a sensor. The speed detection unit 116 can detect, for example, speed data indicating speed values of the automobile 100.

The powertrain 110 is connected, for example, to the processor 112. The powertrain 110 can, for example, move or propel the automobile 100. A desired output of the powertrain 110 can be controlled, for example, by the processor 112.

The processor 112 is connected, for example, to the pedal system 104, the memory 106, the user input unit 108, the powertrain 110, and/or the speed detection unit 116. The processor 112 can receive the pedal data from the pedal system 104, the user input data from the user input unit 108, and/or the speed data from the speed detection unit 116. In addition, the processor 112 can, for example, adjust the pedal map 114 in the memory 106 and/or control a desired output of the powertrain 110 based on the pedal map 114.

To adjust the pedal map 114, the processor 112 waits until a first user input data indicates that the user wishes to adjust the pedal map 114. For example, the user can depress a button. The processor 112 can note the speed value of the automobile 100 at the time that the processor 112 receives the first user input data indicating that the user wants to adjust the pedal map 114 by analyzing the speed data. The processor 112 can also determine, based on a first pedal data, an original pedal depression amount 118. The processor 112 maintains a speed of the automobile while a user depresses or releases the pedal 118 to adjust a pedal depression amount of the pedal 118 to the corresponding second pedal data. The user then indicates, again through the user input unit 108 and the corresponding user input data that the user has finished adjusting the depression of the pedal 118, thereby generating a second user input data.

Once the processor 112 receives the second user input data, the processor 112 selects a pedal curve from a group of available pedal curves, and adjusts the pedal curve to intersect with the road load pedal angle curve 130. In one embodiment, the pedal curve selected is a pedal curve that corresponds with the second pedal data. However, if the pedal curve that corresponds with the second pedal data is not within the group of available pedal curves, then a different pedal curve that is within the group of available pedal curves is selected. The group of available pedal curves can be, for example, pedal curves with a corresponding pedal depression amount that is within a predetermined range of pedal depression amounts corresponding to the first pedal data.

Once the pedal curve is selected, the processor 112 adjusts the selected pedal curve to intersect with the road load pedal angle curve 130. In one embodiment, the processor 112 smoothes the whole selected pedal curve at various speed values so that it intersects with the road load pedal angle curve 130 but does not include an unacceptably steep slope. The acceptability of the steepness of the slope can vary depending on desired sensitivity allowed by a manufacturer, and can be enforced by the processor to limit the steepness of the slope. In another embodiment, the processor 112 can also adjust other pedal curves in addition to the selected pedal curve to ensure a smooth transition for the user when depressing or releasing the pedal 118.

Figure 6:
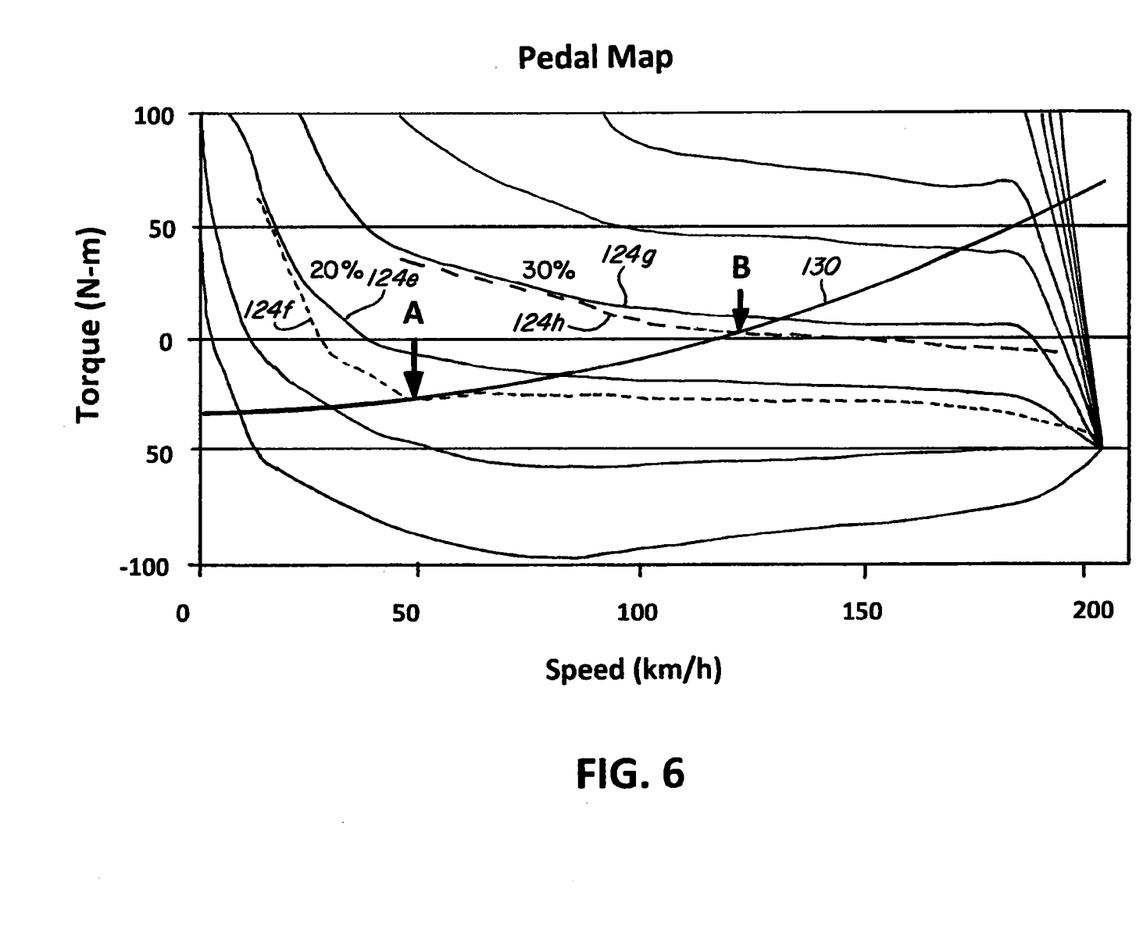
FIG. 6 depicts a pedal map with adjusted pedal curves according to an embodiment of the present invention.

An adjustment of the pedal map 114 can be seen, for example, in FIG. 6. Once the processor 112 has received a user input data indicating that the user wishes to adjust the pedal map 114. The processor 112 then analyzes the speed data to determine the speed value of the automobile 100. In FIG. 6, the speed value can be 50 km/h as indicated by the point A. The processor 112 can also determine, based on a first pedal data, an original pedal depression amount 118 such as a 30% depression of the pedal. The user depresses or releases the pedal to change the pedal depression amount corresponding, for example, to a second pedal data, such as a 20% depression of the pedal. The user then provides a second indication to the user input unit 108 such that the user input data indicates that the user has finished depressing of the pedal.

Once the processor 112 receives the indication that the user has finished adjusting the depression of the pedal 118, the processor 112 selects a pedal curve from a group of pedal curves for adjustment based on the second pedal data (20%) and the speed value (50 km/h). The group of available pedal curves can be dependent, for example, on the original pedal depression amount (30%).

In one embodiment, the range for pedal depression amounts can be, 10%. Thus, the group of available pedal curves can be, for example, pedal curves which correspond to a 20%-40% pedal depression. However, it is understood that the range for pedal depression amounts can be varied depending on the maximum and/or minimum desired sensitivity allowed by a manufacturer, and can be enforced by the processor 112 to limit the pedal curves available in the group of available pedal curves.

By adjusting the pedal map and the pedal curves in the pedal map, the user now only has to depress the pedal by 20% instead of 30% to maintain his desired speed of 50 km/h. This allows a user to customize his driving experience and can increase the comfort level of the driver.

In FIG. 6, the processor 112 selects the pedal curve 124e corresponding to a 20% depression of the pedal. However, if the user had depressed the pedal corresponding to a 15% depression of the pedal, the pedal curve for the 15% pedal depression amount may not be in the group of available pedal curves. In such a case, the processor 112 can automatically select the pedal curve in the group of available pedal curves with a pedal depression amount closest to the pedal depression amount the user indicated. This can reduce, for example, a likelihood that the user depresses or releases the pedal 118 by too much.

Once the pedal curve 124e is selected, the processor 112 adjusts the pedal curve 124e so that it intersects with the road load pedal angle curve 130 at the current speed value (50 km/h) as shown by the pedal curve 124f illustrated in dotted lines. In addition, the processor 112 can selectively adjust other pedal curves, such as the pedal curve 124g to be the pedal curve 124h illustrated by the dotted line. The selective adjustment of other pedal curves can ensure a smooth transition experience for the user.

Figure 7:
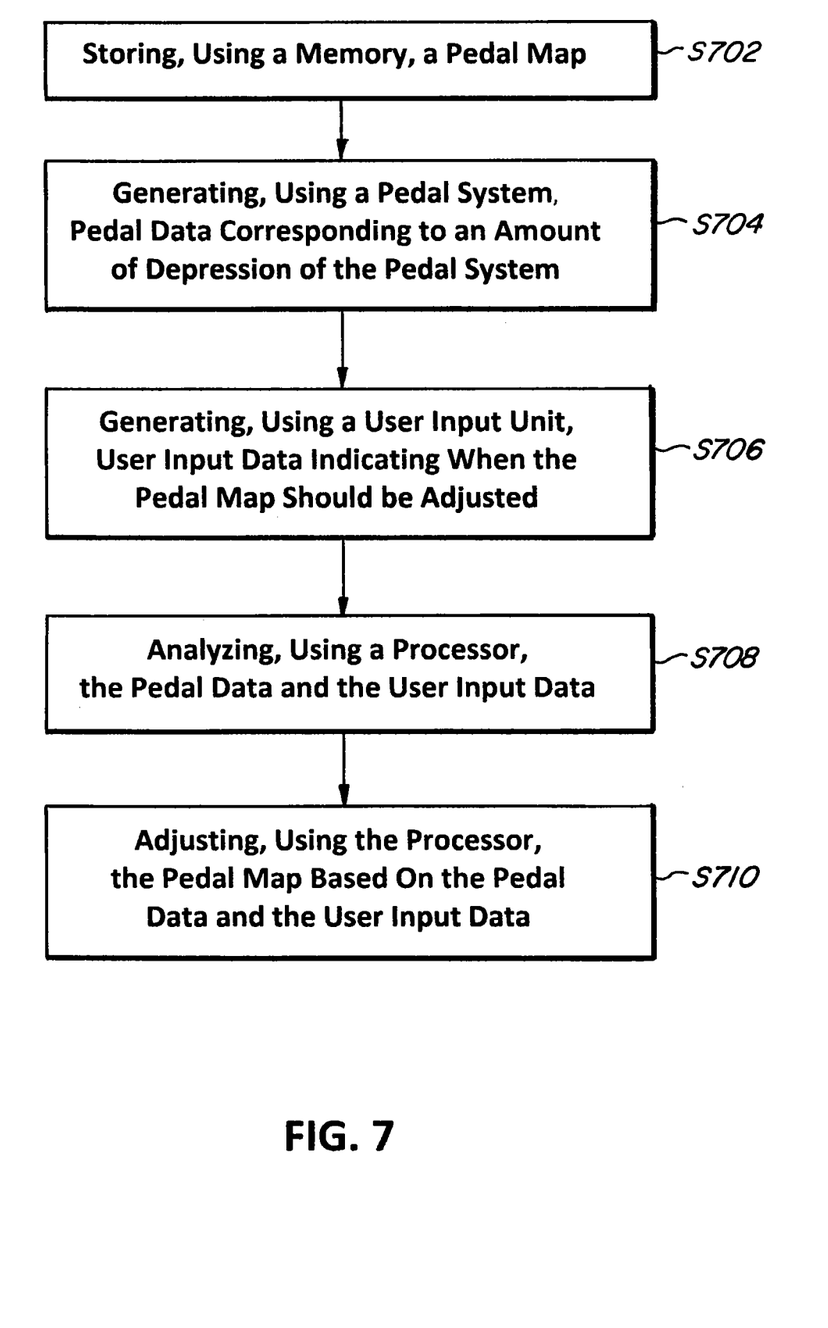
FIG. 7 depicts a process according to an embodiment of the present invention.

In one embodiment, the present invention is a process as shown in FIG. 7. In Step S702, a pedal map is stored using the memory 106. For example, the pedal map 114 can be stored in the memory 106. In Step S704, pedal data can be generated using a pedal system 104, which corresponds to an amount of depression of the pedal system. For example, pedal data can be generated from the pedal system 104 when the pedal 118 is depressed. In Step S706, user input data can be generated using a user input unit to indicate when the pedal map should be adjusted. For example, user input data can be generated by the user input unit 108 to indicate when the pedal map 114 should be adjusted. In Step S708, a processor 112 analyzes the pedal data and the user input data. For example, the processor 112 can analyze the pedal data and the user input data. In Step S710, the pedal map is adjusted using the processor 112, based on the pedal data and the user input data. For example, the processor 112 can adjust the pedal map 114 based on the pedal data and the user input data.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A pedal map adjustment system for an automobile having a powertrain, the pedal map adjustment system comprising:

a memory configured to store pedal map data corresponding to a plurality of pedal curves, each of the plurality of pedal curves associating an output of the powertrain with an automobile speed value for a given pedal depression amount of a plurality of stored pedal depression amounts;

an accelerator pedal configured to generate pedal data indicating a desired pedal depression amount to reach a first automobile speed value corresponding to a speed at which the automobile is currently travelling; and a processor connected to the accelerator pedal and the memory, the processor configured to adjust a pedal curve of the plurality of pedal curves based on the pedal data and control an output of the powertrain based on the adjusted pedal curve, such that the automobile travels at the first automobile speed value when the accelerator pedal is depressed at the desired pedal depression amount.

2. The system of claim 1 further comprising an input unit configured to generate input data indicating when the pedal map data should be adjusted, wherein the processor only adjusts the pedal map data when the input data indicates that the pedal map data should be adjusted.

3. The system of claim 1 wherein the processor is further configured to adjust a slope of the pedal curve.

4. The system of claim 1 further comprising an automobile speed detection unit connected to the processor and configured to detect automobile speed data corresponding to automobile speed values,
wherein the processor is further configured to select the pedal curve from the plurality of pedal curves and adjust the selected pedal curve based on the detected automobile speed data and the pedal map data.

5. The system of claim 1 wherein the processor is further configured to adjust a second pedal curve of the plurality of pedal curves to smoothen a transition between at least two pedal depression amounts of the plurality of pedal depression amounts.

6. The system of claim 1 wherein the processor is further configured to maintain the speed at which the automobile is currently travelling while the accelerator pedal is depressed or released to generate the desired pedal depression amount.

7. The system of claim 1 further comprising an automobile speed detection unit connected to the processor and configured to detect automobile speed data corresponding to automobile speed values, wherein the pedal map data includes a road load pedal angle curve, and wherein the processor is configured to select the pedal curve from the plurality of pedal curves based on the pedal data and the automobile speed data and adjust the selected pedal curve to intersect with the road load pedal angle curve.

8. The system of claim 7 wherein the processor is configured to select the pedal curve from a group of available pedal curves in the plurality of pedal curves, wherein the pedal curves in the group of available pedal curves are based on the pedal data and the automobile speed data.

9. The system of claim 7 wherein the road load pedal angle curve indicates for a given automobile speed value, the pedal data required to maintain the automobile speed data at the given automobile speed value.

10. The system of claim 1 wherein the processor is further configured to automatically select the pedal curve that most closely corresponds to the pedal depression amount, and the processor is further configured to adjust a slope of the selected pedal curve based on slope data stored in the memory and the desired pedal depression amount.

11. A vehicle comprising:
a powertrain configured to generate torque outputs; and
a pedal map adjustment unit connected to the powertrain, the pedal map adjustment unit including:
a memory configured to store pedal map data corresponding to a plurality of pedal, each of the plurality of pedal curves associating a torque output of the powertrain with a vehicle speed value for a given pedal depression amount of a plurality of stored pedal depression amounts,
a pedal configured to adjust an acceleration of the vehicle and generate pedal data, the pedal data corresponding to a pedal depression amount and indicating a desired adjustment of a pedal depression amount required to maintain the vehicle at a first vehicle speed value corresponding to a speed at which the vehicle is currently travelling, and
a processor connected to the pedal, the memory, and the powertrain, the processor configured to adjust a pedal curve of the plurality of pedal curves based on the pedal data and control a requested torque output of the powertrain based on the pedal map data and the adjusted pedal curve, such that the vehicle travels at the first vehicle speed value when the accelerator pedal is depressed at the desired pedal depression amount.

12. The vehicle of claim 11 further comprising an input unit configured to generate input data indicating when the pedal map data should be adjusted wherein the processor only adjusts the pedal map data when the input data indicates that the pedal map data should be adjusted.

13. The vehicle of claim 11 wherein the pedal map adjustment unit further includes a vehicle speed detection unit connected to the processor and configured to detect vehicle speed data corresponding to vehicle speed values, and the processor is further configured to select the pedal curve from the plurality of pedal curves and adjust the selected pedal curve based on the vehicle speed data.

14. The vehicle of claim 13 wherein the pedal map data includes a road load pedal angle curve, and the processor is further configured to select a pedal curve from the plurality of pedal curves and adjust the selected pedal curve to intersect with the road load pedal angle curve, and wherein the plurality of pedal curves are based on the pedal data and the vehicle speed data.

15. The vehicle of claim 14 wherein the road load pedal angle curve indicates for a given vehicle speed value, the pedal data required to maintain the vehicle speed data at the given vehicle speed value.

16. A method of adjusting a pedal map of an automobile having a powertrain, the method comprising:
storing, using a memory, pedal map data corresponding to a plurality of pedal curves, each of the plurality of pedal curves associating an output of the powertrain with an automobile speed value for a given pedal depression amount of a plurality of stored pedal depression amounts;
generating, using a pedal, pedal data corresponding to a pedal depression amount to reach a first automobile speed value corresponding to a speed at which the automobile is currently travelling, thereby indicating a desired adjustment to the pedal map;
analyzing, using a processor, the pedal data and the input data;
adjusting, using the processor, a pedal curve of the plurality of pedal curves based on the pedal data; and
controlling, using the processor, an output of the powertrain based on the adjusted pedal curve such that the automobile travels at the first automobile speed value when the accelerator pedal is depressed at the desired pedal depression amount.

17. The method of claim 16 further comprising:

generating, using an input unit, input data indicating when the pedal map data should be adjusted; and adjusting the pedal map data only when the input data indicates that the pedal map data should be adjusted.

18. The method of claim 16 further comprising:

detecting, using an automobile speed detection unit, automobile speed data corresponding to automobile speed values; and selecting, using the processor, the pedal curve from the plurality of pedal curves, wherein the step of adjusting the pedal map data is based on the automobile speed data and the pedal map data.

19. The method of claim 16 further comprising:

detecting, using an automobile speed detection unit, automobile speed data corresponding to automobile speed values;

selecting, using the processor, the pedal curve from the plurality of pedal curves; and adjusting, using the processor, the selected pedal curve to intersect with a road load pedal angle curve based on the pedal data and the automobile speed data.

20. The method of claim 19 wherein the plurality of pedal curves are based on the pedal data and the automobile speed data, and the road load pedal angle curve indicates for an automobile speed value, the pedal data required to maintain the automobile speed data at the automobile speed value.

* * * * *